No. 629,162. Patented July 18, 1899.
J. C. HASTINGS.
CULTIVATOR.
(Application filed Feb. 18, 1899.)

(No Model.) 3 Sheets—Sheet 1.

WITNESSES:
C. S. Frye.
J. A. Walsh.

INVENTOR
John C. Hastings,
BY
Chester Bradford,
ATTORNEY.

No. 629,162.  
J. C. HASTINGS.  
CULTIVATOR.  
(Application filed Feb. 18, 1899.)

Patented July 18, 1899.

(No Model.)

3 Sheets—Sheet 2.

WITNESSES:
C. S. Frye
J. A. Walsh

INVENTOR
John C. Hastings,
BY
Chester Bradford,
ATTORNEY.

No. 629,162. Patented July 18, 1899.
J. C. HASTINGS.
CULTIVATOR.
(Application filed Feb. 18, 1899.)
(No Model.) 3 Sheets—Sheet 3.
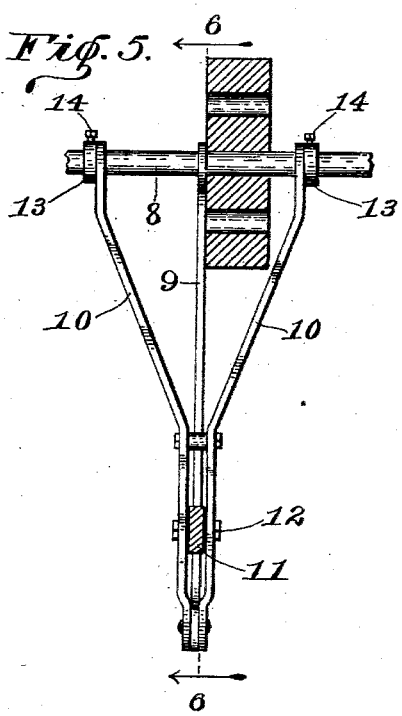
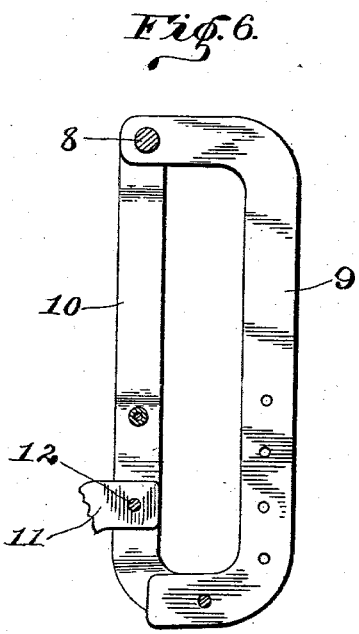
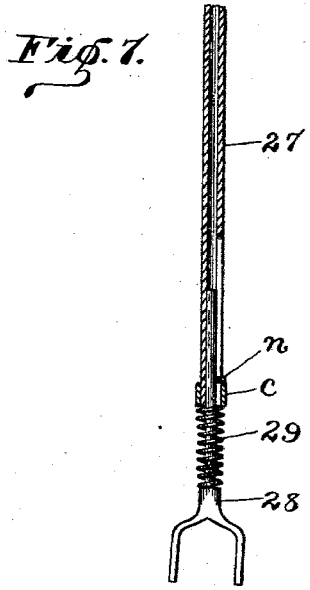
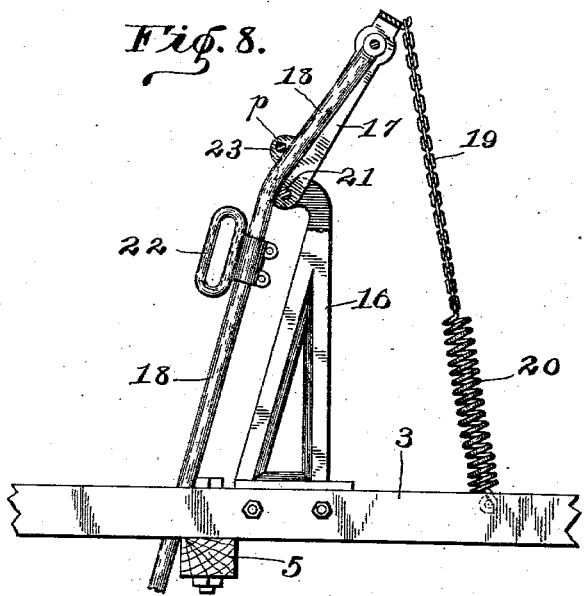
WITNESSES
C. S. Frye
J. A. Walsh
INVENTOR
John C. Hastings,
BY
Chester Bradford,
ATTORNEY.
THE NORRIS PETERS CO., PHOTO-LITHO., WASHINGTON, D. C.

UNITED STATES PATENT OFFICE.

JOHN C. HASTINGS, OF INDIANAPOLIS, INDIANA.

CULTIVATOR.

SPECIFICATION forming part of Letters Patent No. 629,162, dated July 18, 1899.

Application filed February 18, 1899. Serial No. 706,026. (No model.)

*To all whom it may concern:*

Be it known that I, JOHN C. HASTINGS, a citizen of the United States, residing at Indianapolis, in the county of Marion and State of Indiana, have invented certain new and useful Improvements in Cultivators, of which the following is a specification.

My said invention consists in certain improvements in that class of agricultural implements known as "cultivators," whereby various advantages are secured.

A machine embodying my present invention will be first fully described, and the novel features thereof then pointed out in the claims.

Figure 2:
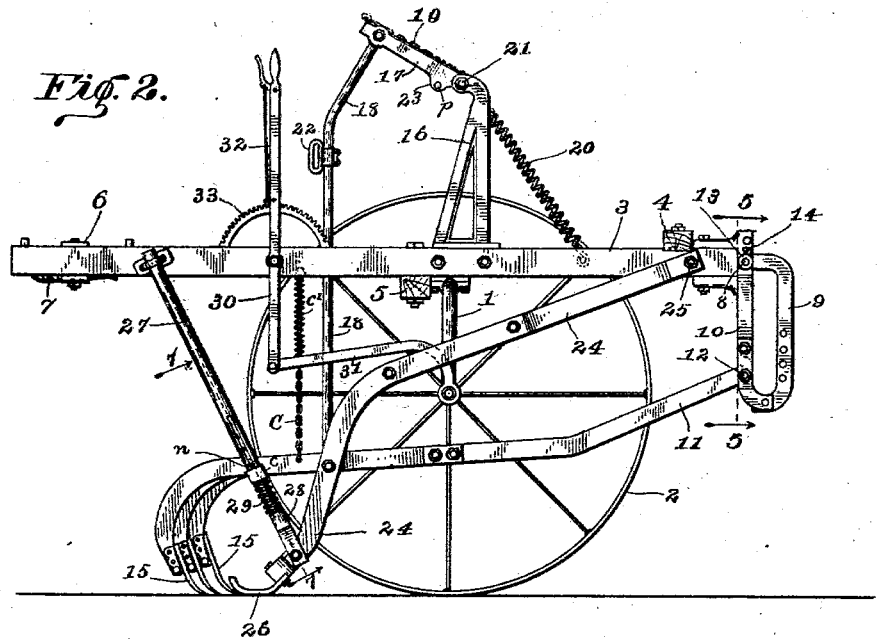
Figure 1:
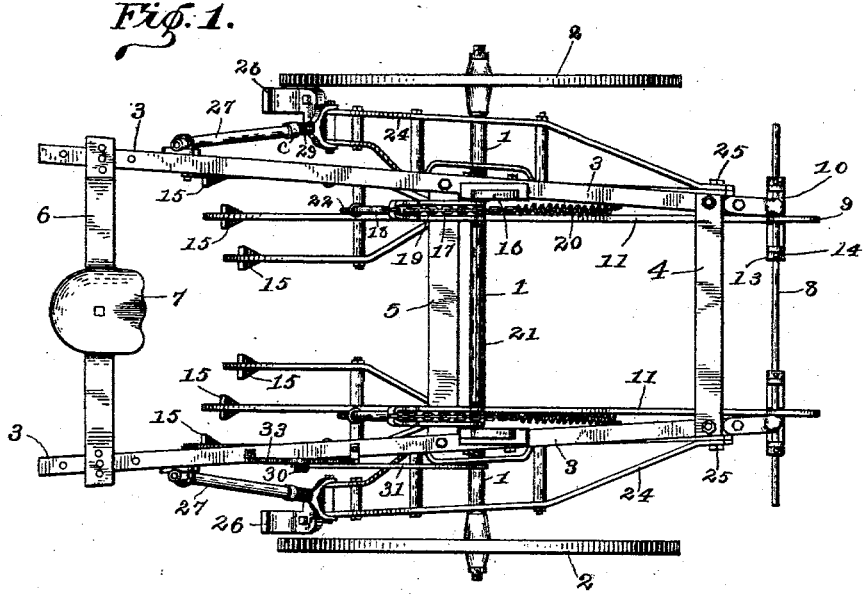
Figure 3:
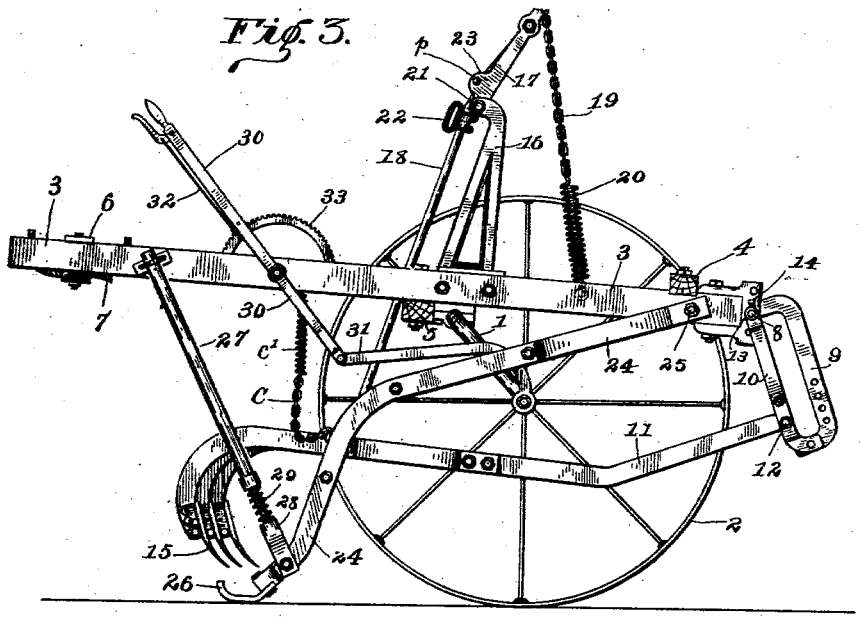
Figure 4:
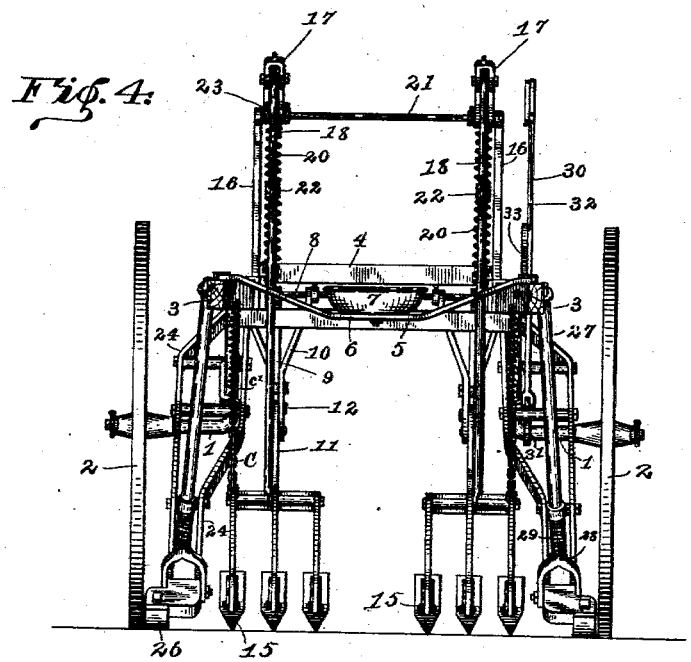

Referring to the accompanying drawings, which are made a part hereof and on which similar reference characters indicate similar parts, Figure 1 is a top or plan view of a cultivator embodying my present invention, showing the parts in the position they occupy when ready for use with a driver mounted thereon; Fig. 2, a side elevation of the same; Fig. 3, a side elevation thereof, showing its various parts in the position occupied thereby when the driver has dismounted and when the plows have been raised free from the ground, as when arranged for storage or transportation; Fig. 4, a rear elevation with the parts in the position shown in Figs. 1 and 2; Fig. 5, a rear view of the clevis and the immediately-adjacent parts, on an enlarged scale, as seen from the dotted line 5 5 in Fig. 2; Fig. 6, a sectional view of the same as seen from the dotted line 6 6 in Fig. 5; Fig. 7, a sectional view of the device for supporting the plow-beams from the runner as seen from the dotted line 7 7 in Fig. 2; and Fig. 8, a detail view, on an enlarged scale, similar to the upper portion of Fig. 3, some portions, however, being broken away for purposes of clearness.

In detail an arched axle is mounted on ordinary wheels 2 and in turn carries the frame composed of the longitudinal bars 3 and the transverse bars 4, 5, and 6, upon the latter of which a seat 7 is preferably placed. Upon the forward ends of the frame-bars 3 are suitable bearings carrying a transverse rod or shaft 8, and upon this are the clevis structures. Said structures are composed, as best shown in Fig. 5, of a central bar 9, to which by means of suitable holes therein, as shown in Fig. 6, the singletrees are commonly to be attached, and two bars 10, to which the plow-beams 11 are to be secured by pivots 12. The bars 10 are brace-like in form, as shown, and thus aid in making a stiff structure not liable to be swayed or bent sidewise. They are secured in position upon the rod 8 by collars 13, which are secured in place preferably by set-screws 14 and are adjustable from one position to another, as may be desired, and by this means the clevis structures and the plows are adjusted toward or from each other, according to the requirements of the work to be done. The plow-beams 11 carry the plows 15, of which there may be any appropriate number desired. I have shown three plows on each plow-beam.

Extending upwardly from the frame sides 3 are pillars or standards 16, to the upper ends of which are pivoted swinging arms 17, and from the ends of these swinging arms rods 18 extend down and connect with the plow-beams. From the outer ends of the arms 17 also extend chains or ropes 19, and these in turn are connected to springs 20, the lower ends of which are attached to the frame sides 3. When the plows are in operation, the position of these parts is as indicated in Fig. 2, with the springs distended and the bar 18 in its lowermost position. When, however, it is desired to raise the plow-beams free from the ground, it is done by swinging the arms 17 over into the postion shown in Fig. 3, and they are held to such position by the tension of the spring 20, as will be readily understood. When in this position but little strain comes upon the spring, as the pull on the rods 18 is exerted in a line substantially transverse the pivots 21, which carry the arms 17. The manipulation of these parts is effected by means of the handle 22 on the rod 18. Ears 23 are formed on the pivoted arms 17 and have suitable perforations, as shown, through which a pin *p* may be inserted behind the rod 18 when the latter is raised, thus locking the parts together and preventing a return from the position shown in Fig. 3 to the position shown in Fig. 2 until said pin is removed.

Runner-bars 24 are secured by suitable pivot-bolts 25 to the frame parts 3 and extend rearwardly and downwardly to the ground and bear shoes or runners 26 on their rear lower ends. Extending from the runner-beams 24 to the frame sides 3 are telescopic structures composed of a tubular portion 27, a preferably forked portion 28, the shank of which enters said tubular portion, and a spring 29, coiled about the shank and interposed between the forked head and the lower end of the tubular portion 27. The form and construction of the structure in question are best shown in Fig. 7, while its arrangement and use are shown in Figs. 2 and 3. The lower end of the tubular telescopic bar 27 is slitted on one side, and the shank of the part 28 is held and guided in position by a pin $n$, extending out therefrom into said slit, and the extreme lower end of the bar 27 is thickened and strengthened by means of a collar $c$ thereon, against which the spring 29 immediately rests. As will be readily seen, the frame of the machine is supported from the shoe through the structure which has just been described, and the spring interposed in said structure gives the support a considerable degree of elasticity, which is both of considerable advantage to the operation of the machine and at the same time serves the usual purposes of a spring-support to the seat for the rider. These telescopic and yielding connections also prevent the cultivator when the shoes strike obstructions from being tipped or lifted and the plows thus disarranged or thrown out of the ground, as the springs 29 will yield under the force of the blow and permit the shoes to pass over such obstructions with but slight effect on any of the other parts.

My improved cultivator is so arranged as that it can be shifted to be used equally well when a rider is mounted thereon as when the rider is dismounted. The positions of the parts in the former case are shown in Fig. 2 and in the latter case in Fig. 3. As shown in Fig. 2, when a rider is mounted on the cultivator the arch of the axle 1 should be substantially upright, and the arrangement is such that the weight of the rider when the axle is in this position substantially counterbalances that portion of the structure in front of the axle so far as such counterbalancing is necessary. When, however, the weight of the rider is removed, if the same position were maintained the front of the cultivator would tip forward, throwing it out of proper position for work. I have therefore provided a lever 30, connected to the lower portion of the axle by a link 31, said lever being controlled by an ordinary latch 32 thereon engaging with an ordinary segment 33. By throwing these parts from the position shown in Fig. 2 to the position shown in Fig. 3 the axle-bearings carried by the wheels 2 are thrown sufficiently forward so that the rear portion of the frame will sufficiently counterbalance the forward portion without the weight of the driver, as will be readily understood.

As will be readily seen by examining the drawings, especially Fig. 1, the cross-bar 6 and seat 7 may be adjusted to any one of several positions on the side pieces 3 of the frame, thus adapting the same to drivers of different weights.

The connection between the rear portion of the plow-beam 11 and the portion of the frame immediately thereabove is made by means of a chain C and spring $c'$. This connection is adapted to receive the shock of the rapidly-descending plow-beams as the bar 18 is thrown over from the position shown in Fig. 3 to the position shown in Fig. 2 and break the force of the descent. It also has a tendency to prevent the plows from entering the ground too deeply and may be regulated to serve this purpose to any extent desired.

Having thus fully described my said invention, what I claim as new, and desire to secure by Letters Patent, is—

1. The combination, in a cultivator, of the framework, an axle and wheels supporting the same, a rod transversely extending across the front of the frame, and clevis structures adjustably mounted on said bar, each clevis portion consisting of a central portion and two brace portions carried by said bar at the upper end and coming together at the lower end, and plow-beams connected to the lower ends of said clevises, substantially as set forth.

2. The combination, in a cultivator, with the plow-beams and the framework thereof, and a transverse rod carried by said framework, of clevis structures or attaching devices pivotally mounted on said rod and confined between collars thereon, said collars being adjustable, whereby said clevis structures can be adjusted toward and from each other, said plows being thus also adjustable as desired, substantially as set forth.

3. The combination, in a cultivator, of the axle, the wheels, the frame carried by the axle, clevises carried by the forward ends of the frame, plow-beams attached to the clevises, pillars also carried on said frame, pivoted arms carried by said pillars, rods extending down from the outer ends of said pivoted arms to said plow-beams to which they are attached, a locking device on said pivoted arms and a connection including a spring running from the outer end of said arms to points toward the forward end of the frame, substantially as and for the purposes set forth.

4. The combination, in a cultivator, of the axle, wheels, a framework having pillars or standards thereon, plow-beams, connections running upwardly from said plow-beams and attached to swinging arms on said pillars or standards, said arms having ears thereon with perforations adapted to receive pins, whereby the connections running to the plow-beams may be locked, and said plow-beams thus held to their upper position, substantially as set forth.

5. The combination, in a cultivator, with the frame and the shoes, of telescopic structures whereby the frame is supported from the shoes, said structures including springs, substantially as set forth.

6. The combination, with the frame and the shoes of a cultivator, of telescopic structures composed of the tubular parts 27, the forked parts 28 the shanks whereof enter said tubular parts, and the interposed springs 29, substantially as shown and described.

In witness whereof I have hereunto set my hand and seal, at Indianapolis, Indiana, this 13th day of February, A. D. 1899.

JOHN C. HASTINGS. [L. S.]

Witnesses:
CHESTER BRADFORD,
JAMES A. WALSH.